United States Patent [19]

Owen, Jr. et al.

[11] 4,067,250
[45] Jan. 10, 1978

[54] MECHANISM FOR STRIPPING INSULATION FROM WIRE

[75] Inventors: William S. Owen, Jr., Lenox; George C. Lovejoy, Pittsfield, both of Mass.

[73] Assignee: General Electric Company, Philadelphia, Pa.

[21] Appl. No.: 654,365

[22] Filed: Feb. 2, 1976

[51] Int. Cl.² ............................................ H02G 1/12
[52] U.S. Cl. ............................................... 81/9.51
[58] Field of Search ............... 81/9.5 A, 9.51; 83/924

[56] References Cited

U.S. PATENT DOCUMENTS

| | | | |
|---|---|---|---|
| 2,563,911 | 8/1951 | Beck | 81/9.51 |
| 3,763,723 | 10/1973 | Oprins | 81/9.5 A |
| 3,765,277 | 10/1973 | Sorensen | 81/9.5 A |
| 3,813,966 | 6/1974 | Knuth | 81/9.51 |
| 3,909,911 | 10/1975 | Smith et al. | 81/9.51 |
| 3,911,541 | 10/1975 | Ziemek | 29/33 F |
| 3,913,426 | 10/1975 | Blaha | 81/9.51 |

*Primary Examiner*—James L. Jones, Jr.
*Assistant Examiner*—Roscoe V. Parker
*Attorney, Agent, or Firm*—Francis X. Doyle; William Freedman

[57] ABSTRACT

A mechanism for stripping bonded insulation from a rectangular wire. The wire is inserted into the mechanism through a pair of gripping jaws. On actuation of the mechanism the jaws are triggered to grip the wire. At least one knife is moved orthogonally to the wire surface to engage and penetrate the wire to be stripped. Then the knife is moved longitudinally along the length of the wire to strip insulation and a thin chip or sliver of metal from the wire. On the return stroke, the jaws are opened to release the stripped wire.

9 Claims, 7 Drawing Figures

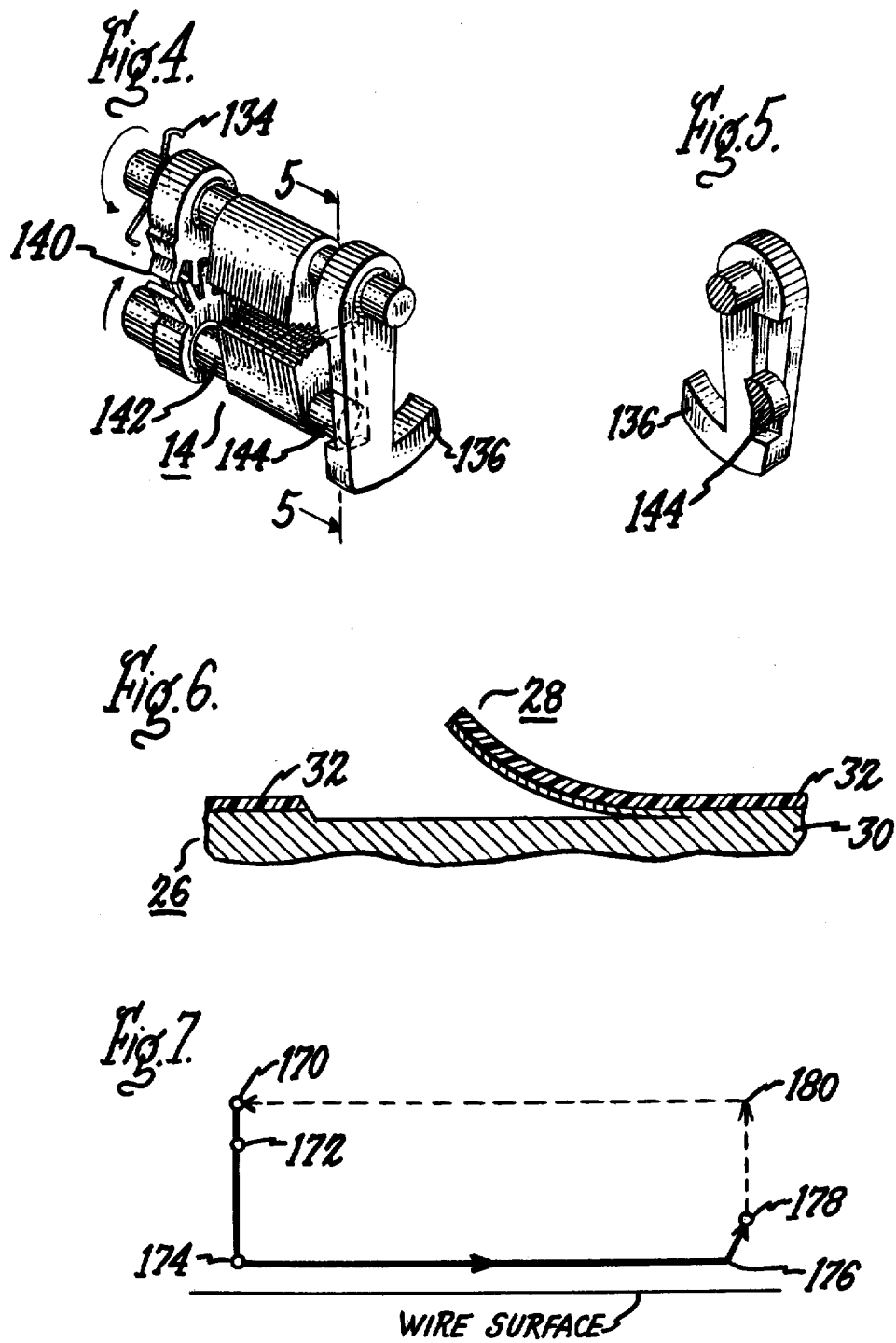

MECHANISM FOR STRIPPING INSULATION FROM WIRE

BACKGROUND OF THE INVENTION

This invention relates to a mechanism for removing insulation from rectangular wire and, more particularly, to a mechanism for removing insulation plus a thin metal chip or sliver from one or both sides of an insulated rectangular wire.

In the manufacture of electrical devices, such as electromagnetic coils and the like, insulated rectangular wire is often utilized to wind such coils. As is well known, it is necessary to make electrical connections to such wire when the coils are used in electrical apparatus, such as for example, transformers and the like. However, as is also well known, such wire if often provided with "enamel" insulation which is bonded to the wire. For example, bonded insulation such as is disclosed in U.S. Pat. No. 3,291,639. As is well understood, such insulation cannot be readily cut and stripped off the wire. The current method of removing such insulation is by scraping, brushing, chemical, thermal, or some combination of such methods. All such methods are very time consuming, and often result in a poor quality wire surface for making electrical connections. Also, some methods are inherently dangerous due to the chemical used, or the high heat used in thermally removing the wire insulation. It is clear that there is presently a need for a mechanism for quickly and efficiently stripping bonded insulation from wire, which does not rely on chemicals or heat and which provides a clean surface for making electrical connections.

It has recently been discovered that a mechanism can be provided which quickly strips insulation from rectangular wire by using a knife which removes a thin chip or sliver of metal from the wire while removing the bonded insulation.

It is, therefore, one object of this invention to provide a mechanism utilizing a knife to strip bonded insulation from rectangular wire.

It is a further object of this invention to provide a mechanism for stripping bonded insulation from rectangular wire in which a thin metal chip or sliver is removed from the wire together with the bonded insulation.

It is still a further object of this invention to provide a mechanism which includes at least one knife which moves essentially parallel to the surface of an insulated rectangular wire cutting the bonded insulation and a thin metal chip or sliver from the surface of the wire.

SUMMARY OF THE INVENTION

Briefly, in carrying out this invention in a preferred form a wire stripping mechanism is provided. The mechanism is provided with a pair of wire gripping jaws and a slide member, carrying at least one knife. The wire to be stripped is inserted into the mechanism. On actuation of the mechanism the jaws clamp the wire and the knife moves orthogonally to engage and penetrate the surface of the wire. The slide then moves longitudinally along the length of the wire causing the knife to move essentially parallel to and below the surface of the wire removing the bonded enamel and a thin metal chip or sliver from the wire leaving a smooth, clean surface for making electrical connections. On the return stroke of the slide, the knife moves above the surface of the stripped wire and unlatches the clamping jaws allowing removal of the stripped wire. In the preferred embodiment a pair of knives are used, stripping both sides of the rectangular wire simultaneously.

The invention which is sought to be protected will be particularly pointed out and distinctly claimed in the claims appended hereto. However, it is believed that this invention and in the manner in which its objects and advantages are obtained, as well as other objects and advantages thereof will be better understood by reference to the following detailed descriptions of a preferred embodiment, particularly when considered in the light of the accompanying drawings.

BRIEF DESCRIPTION OF DRAWINGS

FIG. 4 is a perspective view of the preferred form of clamping jaws of this invention;

FIG. 5 is a perspective sectional view taken along the line 5—5, looking in the direction of the arrows;

FIG. 6 is a sectional view on an enlarged scale showing the removal of a composite chip of insulation and metal from a bonded insulated wire according to the teaching of this invention; and FIG. 7 is a diagram showing the movement of the stripping mechanism of this invention, shown as the movement of the edge of the knife blade.

DESCRIPTION OF PREFERRED EMBODIMENT

Figure 1:
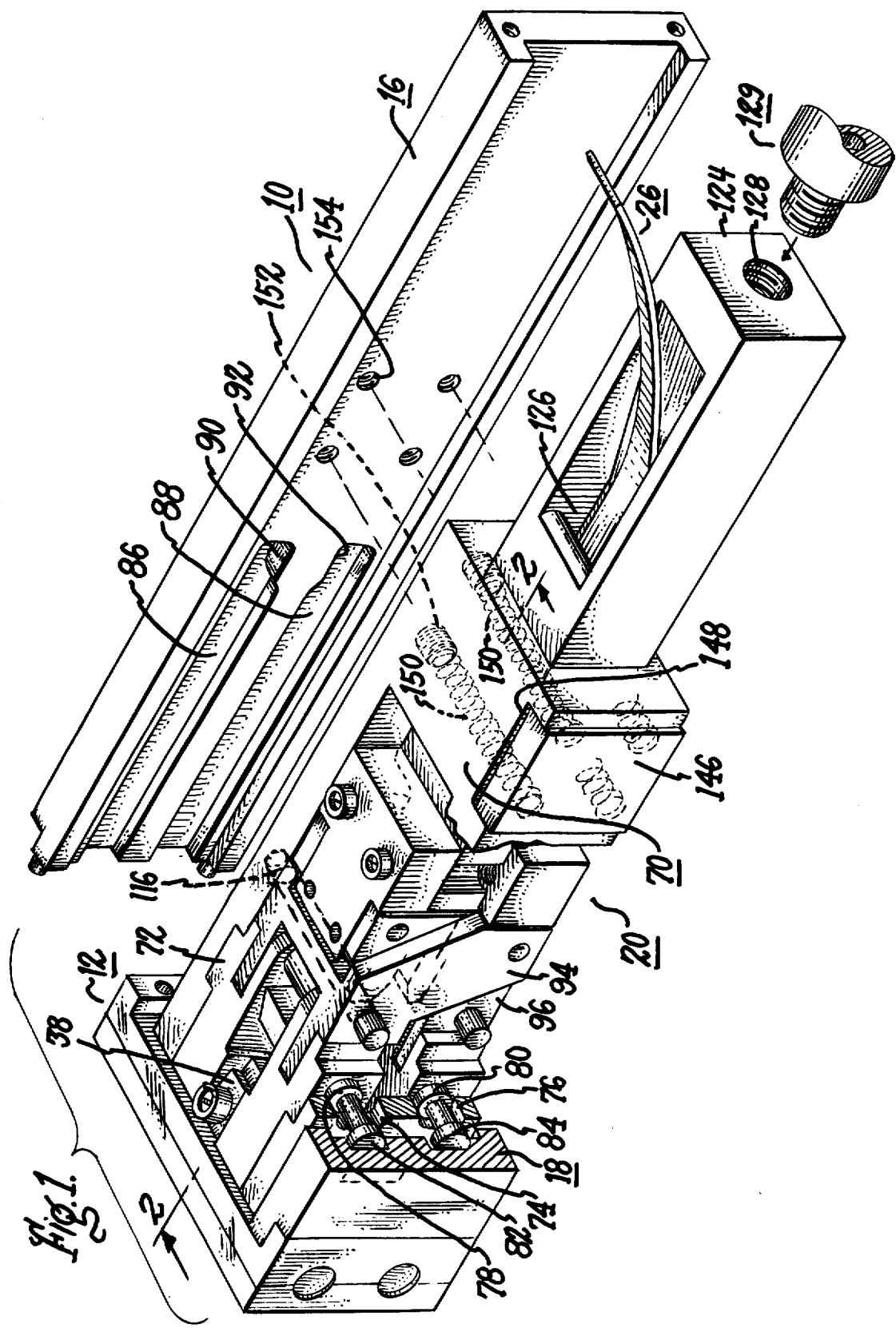
FIG. 1 is a perspective view with parts broken away of the present preferred embodiment of the wire stripper mechanism of this invention.

Referring now to the drawings, wherein like reference numerals are used to indicate like parts throughout the various views thereof, a detailed description of the present preferred embodiment of the wire stripping mechanism of this invention will now be made. Considering first FIG. 1, a perspective view of the preferred form of a two-sided wire stripper is shown with parts exploded and in phantom. The wire stripper 10 comprises a fixed front member 12, including the gripping jaws 14 (see FIGS. 2, 3, 4, and 5), fixed side walls 16 and 18 and the slidable stripping device 20. As will be apparent, especially from FIG. 2, the stripping device 20 has a pair of knife members 22, 24 which engage and penetrate wire 26 and strip the bonded enamel therefrom, together with a thin chip or sliver of metal from the wire, shown in the form of composite chip 28 in FIG. 6.

Referring now briefly to FIG. 6, there is shown a sectional view, on an enlarged scale of a rectangular wire 26 made of electrically conducting metal 30 such as aluminum or copper, and having bonded thereto an enamel insulation 32 such as is disclosed in U.S. Pat. No. 3,291,639. When removing the insulation 32 the knives 22, 24 engage and penetrate the surface of wire 26, cutting through the insulation 32 and into the surface of metal 30, a slight distance, such as 2 mils or less. Movement of the stripping device removes a composite chip which includes the thin metal chip or sliver and the insulation bonded thereto, as shown at 28 in FIG. 6.

Considering now, FIGS. 1, 2, and 3, the detailed construction of stripping mechanism 10 will now be described. Knife members 22, 24 are mounted in knife carriers 34, 36 by knife seats 38, 40. As can best be seen in FIG. 2, blade members 22, 24 have upper and lower parallel flat surfaces 42, 44 respectively, and a sloping surface 46 which forms the cutting edge with the lower flat surface 44. The knife seats 38 and 40 have a flat surface 48 which engages upper surface 42 and angled surface 50 which engages the angled or sloped surface 46 of the knife members 22, 24. The upper surface 52 of blade seats 38, 40 are tapered slightly, approximately 5 to 10 degrees with respect to surfaces 42 and 46, as is shown in FIG. 2. Washer members 54, 56 are complimentary tapered, as shown. Knife seats 38 and 40 are preferably provided with an elongated hole 58, 60 and bolts 62, 64 are used to clamp knife members 22, 24 firmly to the knife seats 38, 40 in the knife carriers 34, 36. As will be understood, elongated holes 58, 60 allows knife members 22, 24 to be moved into cutting position after sharpening, preferably by guiding surface 46. This provides longer life to the knife members 22, 24, which are preferably made of high-speed tool steel. The tapered surfaces of the seats 38, 40 and the washers 54, 56 provide a wedging action, preventing movement of the knife members 22, 24 during cutting and stripping of the insulation.

Knife carriers 34, 36 are provided with rollers 66, 68 which roll on the insulation surface of the wire 26, as shown in FIG. 2. Also provided on knife carriers 34, 36 are shoe surfaces 67, 69, such that the contact surfaces of roller 66 and shoe 67 are in one plane while the contact surface of roller 68 and shoe 69 are in another plane parallel to the one plane. When knife members 22, 24 are in the cutting position, as shown in FIG. 2, the knife edge of knife 22 is approximately 5 mils below the reference surface or plane of the roller 66, and shoe 67 which are shown in contact with the surface of wire 26. In a similar manner, the knife edge of knife 24 is approximately 5 mils above the reference surface or plane of the roller 68 and the shoe 69, which are shown in contact with the insulation surface of wire 26. if the bonded enamel or insulation on the wire 26 is 3 to 4 mils thick then the sliver or chip of metal removed with the insulation will be 1 to 2 mils thick. As will be apparent, if the bonded insulation on the wire to be stripped is more or less than approximately 3 to 4 mils, thicker or thinner knives will be used to insure that a thin sliver of metal will be removed.

Figure 2:
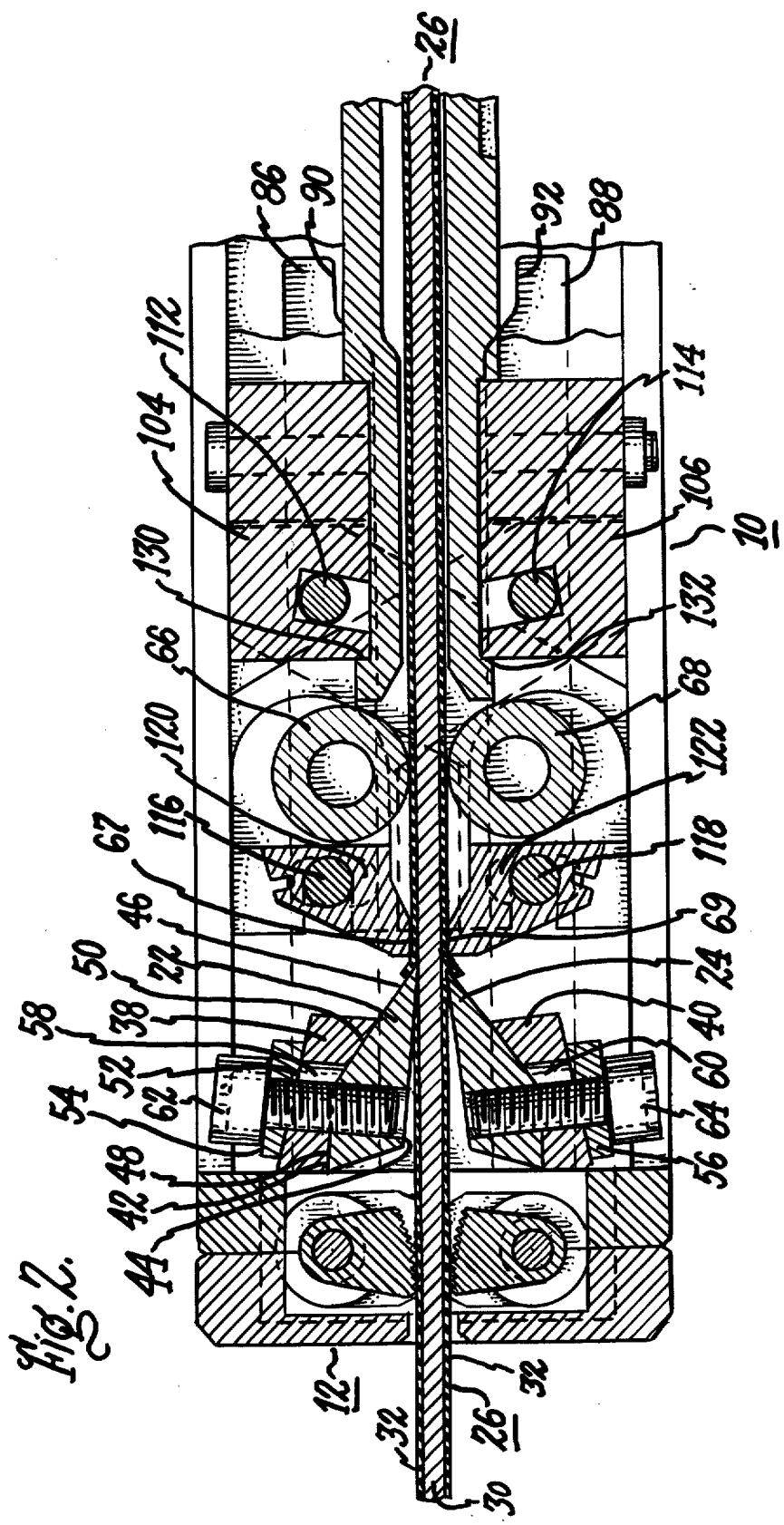
FIG. 2 is a sectional view taken on the line 2—2 of FIG. 1.

The knife carriers 34, 36 are mounted in slide block 70 by means of slots 72 (only one is shown in FIG. 1). As can be seen in FIG. 1, slide block 70 has elongated holes 74, 76 in the slots 72, which receive pins 78, 80 of the knife carriers 34, 36 respectively. Pins 78, 80 are provided with rollers 82, 84 which ride in slots 86, 88 in each of the side walls 16 and 18. Slots 86, 88 are provided with cam surfaces 90, 92 at the end of the slots, for a purpose to be later described.

Figure 3:
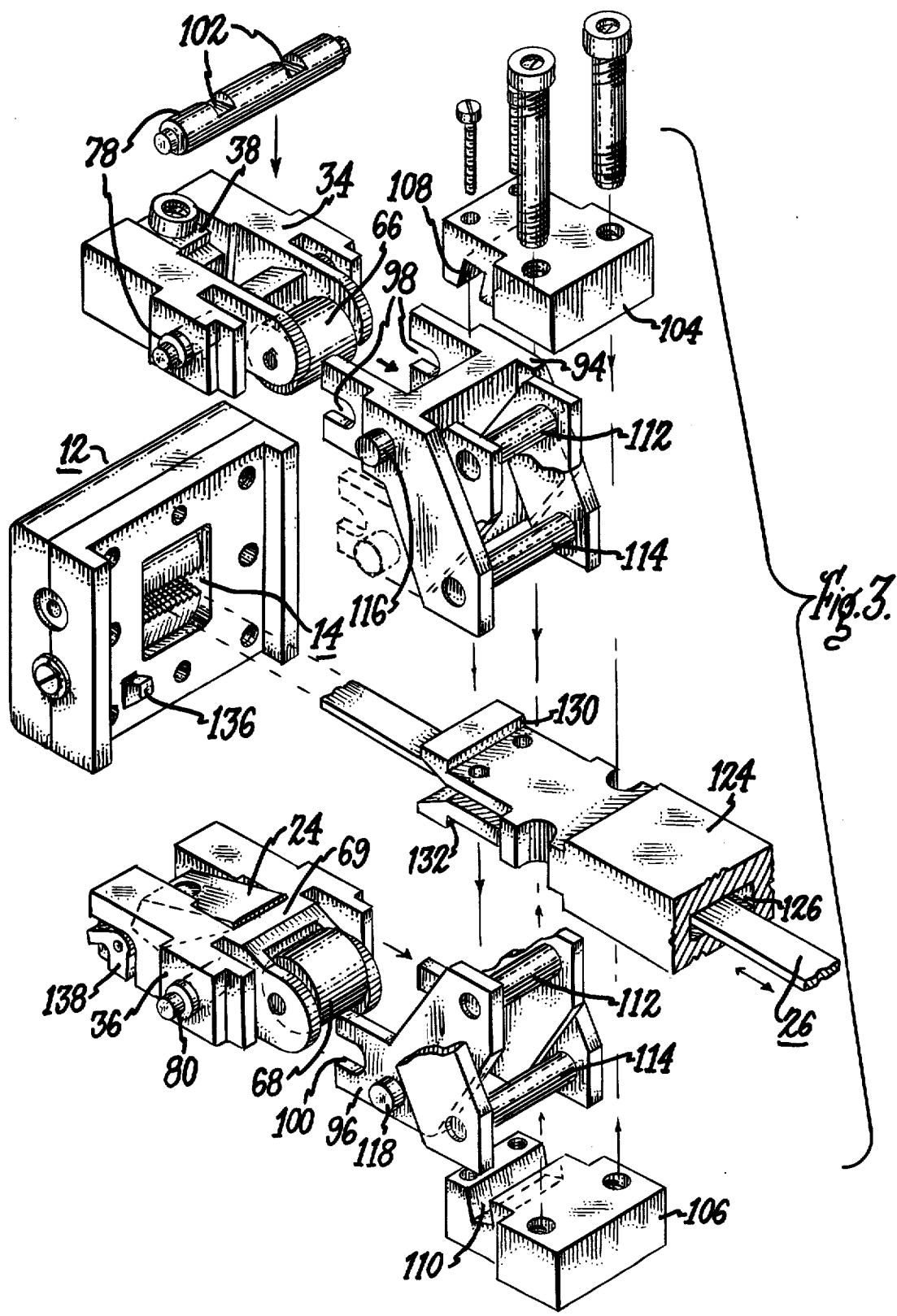
FIG. 3 is an exploded, perspective view of the preferred embodiment of the invention shown in FIGS. 1 and 2.

Linkage members 94, 96 are provided having slots 98, 100 which engage notches 102 on pin 78 and 80 (only notches 102 on pin 78 is shown in FIG. 3). Linkage members 94, 96 are pivotally mounted in sliding block 70 by pivot pins 116, 118, as shown in phantom in FIG. 1. The linkage members 94, 96 are driven by blocks 104, 106, which have notches 108, 110 respectively which engage pins 112, 114 respectively, of linkage members 96, 94 respectively. An actuating member 124 is provided having a slot 126 therethrough for receiving wire 26. The number 124 is provided with means such as the threaded hole 128 for connection to an air cylinder or the like indicated at 129 for actuation thereof. Actuating member 124 is also provided with lips or notches 130, 132 which engage blocks 104, 106 to move slide block 70 along side walls 16, 18 to strip the wire 26.

The spring clamping jaws 14, best shown in FIGS. 4 and 5, are biased in the clamping direction, that is, in the direction of the arrows shown in FIG. 4, by a spring 134. A cam or trigger member 136 is provided which is engaged by cam operator 138 on knife carrier 36, (see FIG. 3) on the rear stroke, to cam the clamping jaws, through gears 140 into the open or nonclamping position. As will be noted, the lower clamping jaw is mounted on shaft 142. One of gears 140 is mounted on one end of shaft 142 while the other end has a portion cut away to provide a cam surface 144. As can be seen from FIGS. 4 and 5, as the cam or trigger member 136 is actuated by cam operator 138, trigger member 136 rotates shaft 142 through cam surface 144 to open clamping jaws 14. Obviously, when trigger member 136 is released on the stripping motion of slide block 70, spring 134 acts to move clamping jaws 14 into clamping engagement with wire 26. As is best shown in FIG. 2, clamping jaws 14 have a variable radius to enable the clamping of various thickness of wires.

Considering again FIG. 1, slide block 70 is shown as having a spring-mounted friction pad 146, contained in slot 148 of slide block 70. Springs 150 (shown in phantom) move friction pad 146 into frictional engagement with side wall 18. The amount of friction between pad 146 and wall 18 can be adjusted by means of screws 152 which can be manipulated through holes 154 in side wall 16.

Before discussing the operation of the wire stripping mechanism of this invention, a brief description of the motion of the knife edge will be made with respect to FIG. 7.

FIG. 7 is a diagrammatic view of the motions of the edge of knife 22 as seen in FIG. 2. The motions that take place are products either direct or converted of the action of the mechanism as actuated by actuator 129. The diagram of FIG. 7 indicates the stripping stroke of the knife edge in solid lines and the return of the knife edge in dotted lines. At the start of the stripping stroke, indicated at 170 in FIG. 7, an orthogonal motion toward the insulated surface of wire 126 commences. Shortly after the stroke commences, the operator 138 releases trigger 136 allowing the clamping jaws 14 to clamp wire 26, indicated at 172. As the othrogonal motion of the knife edge continues, the bonded insulation and the wire is penetrated until the force of the downward movement of the knife edge into wire 26 is greater than the friction caused by friction pad 146 against side wall 18. This is indicated by point 174 in FIG. 7. A longitudinal stroke now begins which removes the composite chip 28, which includes the insulation 32 and a thin chip or sliver of wire as showed in FIG. 6.

The longitudinal stroke continues until rollers 82 and 84 engage cam surfaces 90, 92 in side walls 16 and 18. This point on the stroke is indicated at 176 in FIG. 7. The knife edge then moves in the direction indicated in FIG. 7 (slightly less than right angular to the wire surface) removing composite chip 28 as indicated at point 178 in FIG. 7. The actuator 129 then begins the return stroke, which first moves the knife edge to its fully-open position which is indicated by the line between points 178 and 180 in FIG. 7. At point 180 rollers 82 and 84 engage the upper and lower surfaces, respectively, of slots 86 and 88. At this time, the friction of pad 146 is overcome and actuator 129 causes the return stroke indicated by the line between points 180 and 170 on FIG. 7. At the point 170, at the end of the return stroke, operator 138 engages trigger member 136 to unclamp jaws 14 allowing removal of the wire 26.

The complete operation of the wire stripping mechanism of this invention will now be described. As will be understood, the wire 26 is placed through open clamping jaws 14 and through slot 126 on actuating member 124 as can be seen in FIGS. 1 and 2. As the actuating member 124 is moved away from clamping jaws 14 by the actuator 129, it moves relative to the slide block 70. At this point, the friction provided by friction pad 146 prevents movement of the slide block. This assures the orthogonal movement of the knives 22 and 24 into the surface of the wire 26.

The knives 22 and 24 are moved orthogonally into penetration of wire 26 by the pivoting motion of linkage 94 and 96 about the pivot pins 116 and 118. As can be seen particularly from FIG. 2, as the contact surfaces of rollers 66 and 68 and the shoes 67 and 69 engage the bonded insulation on wire 26, knives 22 and 24 will have penetrated through the insulation and into the wire approximately 1 mil. As will be apparent, the movement of rollers 66, 68 and the shoes 67 and 69 center the wire 26 within the space between these members in the mechanism. This centering provided by the rollers 66, 68 and the shoes 67 and 69 allow uniform stripping of various thicknesses of wire within the limits of the clamping jaws 14 and the knife carriers 34 and 36.

As the edges of the knives 22 and 24 penetrate at metal of wire 26, the point is reached where the force required to move the knife edges further into the wire is greater than the friction provided by friction pad 146. This is the point at which the knife edges are engaged at the desired cutting depth, approximately 5 mils.

Since the friction of pad 146 is overcome, slide block 70 moves longitudinal along the surface of wire 26 stripping the composite chip 28 from the wire 26. This motion continues until roller 82, 84 engage the cam surfaces 90, 92 in the slots 86, 88 of the side walls 16 and 18. On this engagement, the knife carriers 34, 36 and thus the edges of knives 22, 24 are cammed away from the surface of wire 26 causing the composite chip 28 to be removed from the wire 26. This completes the stripping stroke of the wire mechanism 10. As the actuator 129 begins the return stroke, the knife carriers 34, 36 move orthogonally away from the wire 26 due to the pivoting of the linkage 94, 96 on the pins 116, 118. When the rollers 82, 84 engage the upper and lower surfaces respectively of slots 86, 88 in side walls 16 and 18, the friction of pad 146 will be less than the force required to continue the orthogonal motion. At this time, slide block 70 moves forward returning knife carriers 34, 36 to its start position. As previously noted, as block 70 returns to its starting position, the cam operator 138 on the knife carrier 36 engages the cam or trigger member 136 which opens clamp jaws 14 to release the stripped wire.

As will be apparent from the above description, the centering action of the wire stripping mechanism of this invention allows the mechanism to accommodate any wire thickness up to the maximum thickness for which it is designed. Thus, a family of wire sizes may be accordingly stripped without any need to make changes in the mechanism. Thus, within any given family of wire sizes for which the mechanism is designed the mechanism of this invention may be utilized without any requirement to make any changes therein. As earlier noted, if it is desired to strip wires of greater or less bonded insulation thickness, it is only necessary to change the knife members 22, 24 to provide the desired depth of cut according to the thickness of the bonded insulation.

Of course it will be apparent to those skilled in the wire stripping art that the preferred embodiment herein shown could be utilized with only a single cutting blade and stripping the wire first on one side and then the other. Were the stripping done solely on one side, in some instances, it might be desirable to eliminate the clamping jaws and utilize a serrated surface on the lower portion of the stripper device to hold the wire in place during stripping. It will also be apparent to those skilled in the art that various other changes may be made in the particular details of the preferred embodiment. Thus, while there has been shown and described the present preferred embodiment of the wire stripping mechanism of this invention it is to be understood that all such changes and modifications are intended to be covered as fall within the spirit and scope of this invention, particularly as it is defined in the appended claims.

What is claimed as new and which it is desired to secure by letters patent of the United States is:

1. A wire stripping mechanism for stripping bonded insulation from an insulated wire, said mechanism comprising, at least one wire stripping knife said wire stripping knife being mounted in a knife carrier, a linkage device, said linkage device engaging said knife carrier and providing a first orthogonal movement of said at least one knife and including means to cause said knife to penetrate the insulation and the wire and an actuator device for moving said knife and knife carrier in a longitudinal direction for removing insulation and a thin sliver of metal from the insulated wire.

2. A wire stripping mechanism as claimed in claim 1 in which said knife and knife carrier, said linkage, and said actuator device are moveably mounted in a fixed member, said fixed member including a pair of clamping jaws for clamping said wire to enable said knife to strip said wire.

3. A wire stripping mechanism as claimed in claim 2 in which said fixed member is provided with channels in which said knife carrier is moved, said channels being provided with a camming surface at the end of the wire stripping stroke for raising said at least one knife and removing said insulation and said sliver of wire from said wire member.

4. A wire stripping mechanism for stripping bonded insulation from an insulated wire, said mechanism comprising; at least on wire stripping knife, said wire stripping knife being mounted in a knife carrier, a slide member, said knife carrier being mounted in said slide member, a linkage device, said linkage device being pivotally mounted in said slide member and engaging said knife carrier for providing a first orthogonal movement of said knife and said knife carrier and including means causing said knife to penetrate the insulated wire into the metal forming the wire, an actuator connected to said slide member and said linkage device, said actuator providing a second longitudinal movement of said knife and knife carrier along the length of the insulated wire for removing a composite chip which includes the bonded insulation and sliver of the metal forming the wire.

5. A wire stripping mechanism as claimed in claim 4 in which said knife, said knife carrier, said slide member, said linkage device and said actuator are movably mounted in a fixed member, said fixed member including a pair of clamping jaws for clamping the insulated wire, enabling said knife to strip said composite chip from the insulated wire.

6. A wire stripping mechanism as claimed in claim 5 in which said clamping jaws are provided with a variable radius for clamping insulated wire of varying thickness.

7. A wire stripping mechanism as claimed in claim 5 in which said fixed member is provided with channels in which said knife and said knife carrier are moved, said channels being provided with camming surfaces which are effective at the end of said longitudinal movement to provide said knife with a substantially orthogonal movement away from the insulated wire to separate said composite chip from the insulated wire.

8. A wire stripping mechanism as claimed in claim 4 in which said knife carrier is provided with a wire surface engaging shoe and a wire surface engaging roller, said shoe and said roller defining a plane, and said knife mounted in said knife carrier such that the edge of said knife is displaced from said plane a predetermined distance determining the depth of penetration of the edge of said knife into the insulated wire.

9. A wire stripping mechanism as claimed in claim 5 in which said slide member is provided with a spring-mounted friction pad, such friction pad engaging a side wall of said fixed member, said friction pad preventing movement of said slide member util the forces moving said knife in an orthogonal direction to penetrate the insulated wire are greater than the friction force of said friction pad on said side wall of said fixed member.

* * * * *